United States Patent [19]

Adato

[11] Patent Number: 5,498,019
[45] Date of Patent: Mar. 12, 1996

[54] SUSPENSION SYSTEM FOR CONTROLLING LATERAL DISPLACEMENT OF A WHEEL

[76] Inventor: Henri Adato, 6 Fanton Hill Rd., Weston, Conn. 06883

[21] Appl. No.: 356,579

[22] Filed: Dec. 15, 1994

[51] Int. Cl.$^6$ .................................................. B60G 3/26
[52] U.S. Cl. ............................................ 280/675; 280/673
[58] Field of Search ................................. 280/673, 675, 280/661, 725, 726, 663

[56] References Cited

U.S. PATENT DOCUMENTS

| | | | |
|---|---|---|---|
| 2,767,998 | 10/1956 | Powell | 280/675 |
| 3,680,881 | 8/1972 | Douglas | 280/675 |
| 4,457,537 | 7/1984 | von der Ohe et al. | 280/675 |
| 4,458,915 | 7/1984 | Emery | 280/668 |
| 4,545,602 | 10/1985 | Shibahata | 280/701 |
| 4,842,297 | 6/1989 | Takahashi | 280/675 |
| 5,000,477 | 3/1991 | Minakawa et al. | 280/690 |
| 5,098,116 | 3/1992 | Edahiro et al. | 280/661 |
| 5,114,176 | 5/1992 | Sawai | 280/691 |
| 5,286,052 | 2/1994 | Lukianov | 280/675 |

*Primary Examiner*—Kenneth R. Rice
*Attorney, Agent, or Firm*—Finnegan, Henderson, Farabow, Garrett & Dunner

[57] ABSTRACT

A wheel suspension system includes a wheel support for rotatably supporting a wheel spaced laterally a predetermined distance from a vehicle chassis. A wishbone assembly pivotally connects the wheel support to the vehicle chassis. The wishbone assembly preferably includes a wishbone having a first end pivotally connected to the wheel support and second ends opposite the first end. The wishbone assembly also includes a lever, which extends between the wheel support and each of the second ends of the wishbone. The lever slidably engages with the wheel support and pivotally connects to the second ends of the wishbone. The wishbone assembly further includes a bracket mounted on the chassis for pivotally supporting the lever between the wheel support and each of the second ends of the wishbone. The above configuration provides a wishbone assembly which controls the lateral displacement of the wheel in response to movement of the wheel.

22 Claims, 9 Drawing Sheets

SUSPENSION SYSTEM FOR CONTROLLING LATERAL DISPLACEMENT OF A WHEEL

BACKGROUND OF THE INVENTION

The present invention relates to a wheel suspension system and, more particularly, to a wheel suspension system for controlling the lateral displacement of a wheel in response to vertical movement of the wheel.

Suspension systems support and cushion the ride of a vehicle. One type of conventional wheel suspension system involves a wishbone design, as generally shown in FIGS. 1, 2A, and 2B. The traditional wishbone suspension system includes an upper wishbone and lower wishbone connected to a wheel support on one end and a vehicle chassis on the other end. Typically, the upper and lower wishbones are spaced above and below the center line of the wheel support as defined by the axle of the wheel.

Numerous drawbacks are encountered by conventional wishbone designs. Ordinarily, the conventional wheel support is displaced vertically in response to various surface conditions encountered by the tire of the vehicle. Indeed, if the wishbones are not pointed directly away from the center line of the vehicle, the wheel ordinarily will move closer to the center line of the vehicle in response to vertical displacement of the wheel, as shown in FIG. 2B. The periodic lateral displacement of the wheel resulting from variations in road surfaces typically will result in increased wear on the tire, lessened roadholding performance, and reduced gas mileage.

Related art includes systems that have been designed to provide more uniform contact of the tire to the road during movements of the wheel and systems designed to reduce roll center movement and camber changes.

U.S. Pat. No. 5,114,176 discloses a suspension system for a steered wheel in which the contact between the wheel and ground is maintained substantially uniform during all movements of the wheel. The suspension system includes an axle carrier having a bifurcated upper portion consisting of inwardly extending arms that are pivotally connected through a pin-type joint to a pair of inwardly facing arm sections of a Y-shaped upper arm. Additionally, a generally Y-shaped lower arm is pivotally supported along a pair of brackets affixed to the body.

U.S. Pat. No. 5,286,052 discloses a double wishbone suspension system for a motor vehicle. The suspension system includes a lower transversely extending control arm and an upper control arm, which are pivotally connected to lower and upper wheel carriers, respectively. This patent is directed to achieving reduced roll center movement and enables wheel camber changes relative to the vehicle body during vertical movement of the suspension travel, as the wheel responds to changing road conditions. While various suspension systems have attempted to overcome various problems with standard suspension systems, none have allowed the successful control of horizontal displacement of the wheel relative to the center line of the chassis of the vehicle.

SUMMARY OF THE INVENTION

Accordingly, the present invention is directed to a suspension system that overcomes the limitations and disadvantages of the related art.

An advantage of the present invention is its simple design that is nevertheless capable of providing control over the lateral displacement of the wheel in response to vertical movement of the wheel. Another advantage is that the suspension system can be used with wishbones presently available for use on vehicles' chassis by integrating an appropriately designed lever and bracket into the wheel suspension system. Additional features and advantages of the invention will be set forth in the description which follows, and in part will be apparent from the description, or may be learned by practice of the invention. The objects and other advantages of the invention will be realized and attained by the wheel suspension system particularly pointed out in the written description and claims hereof as well as the appended drawings.

To achieve these and other advantages and in accordance with the purpose of the invention, as embodied and broadly described, the invention comprises a wheel support for rotatably supporting a wheel spaced laterally a predetermined distance from a vehicle chassis. The invention also includes a wishbone assembly for pivotally connecting the wheel support to the vehicle chassis. The wishbone assembly preferably includes a wishbone having a first end pivotally connected to the wheel support and second ends opposite the first end. The wishbone assembly also includes a lever extending between the wheel support and each of the second ends of the wishbone. The lever is slidably connected to the wheel support and is pivotally connected to the second ends of the wishbone. The wishbone assembly further includes a bracket, which is mounted on the chassis, for pivotally supporting the lever between the wheel support and each of the second ends of the wishbone. Accordingly, the wishbone assembly of the present invention controls the lateral displacement of the wheel in response to movement of the wheel.

Preferably, the wishbone assembly also includes a secondary wishbone having a first end pivotally connected to the wheel support and second ends opposite the first end. The wishbone assembly includes a secondary lever extending between the wheel support and each of the second ends of the secondary wishbone. The secondary lever is slidably connected to the wheel support and is pivotally connected to the second ends of the secondary wishbone. The wishbone assembly also includes a secondary bracket, which is mounted on the chassis, for pivotally supporting the secondary lever between the wheel support and each of the second ends of the secondary wishbone.

In another embodiment, the wishbone assembly includes a secondary wishbone pivotally connected to the wheel support and operatively connecting to the wishbone. The wishbone assembly also includes a spacer bar pivotally connected to the second ends of the secondary wishbone and the second ends of the wishbone. The wishbone assembly may also include a support bar pivotally connected to the second ends of the secondary wishbone, together with a secondary bracket that is mounted on the chassis for pivotally supporting the support bar.

Preferably, the invention also includes a wishbone assembly having a second bracket depending from the chassis and disposed above the wishbone assembly for pivotally supporting the lever between the wheel support and each of the second ends of the wishbone. The lever between the bracket and the second bracket is pivotally connected and adapted to have an adjustable length.

It is to be understood that both the foregoing general description and the following detailed descriptions are exemplary only, and are not restrictive of the invention, as claimed.

BRIEF DESCRIPTION OF THE DRAWINGS

The accompanying drawings are included to provide a further understanding of the invention and are incorporated in and constituted a part of the specification. The drawings illustrate several embodiments of the invention and together with the description, serve to explain the principles of the invention. In the drawings.

A DESCRIPTION OF THE PREFERRED EMBODIMENTS

Reference will now be made in detail to the present preferred embodiments of the invention, examples of which are illustrated in the accompanying drawings.

Figure 1:
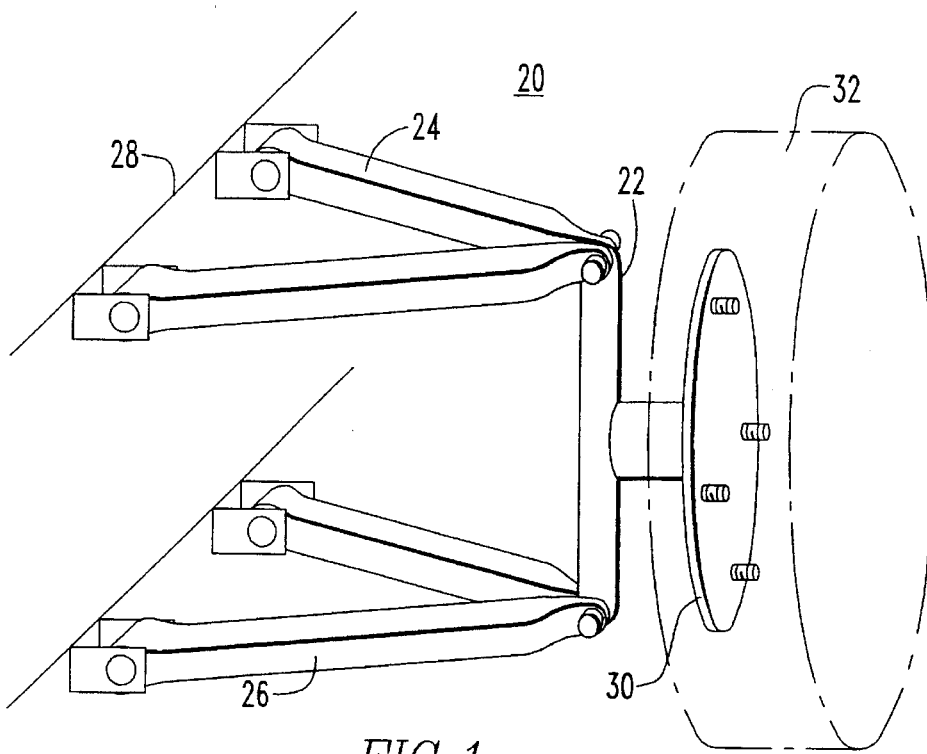
FIG. 1 is a perspective view of a conventional wishbone suspension system.
Figure 2A:
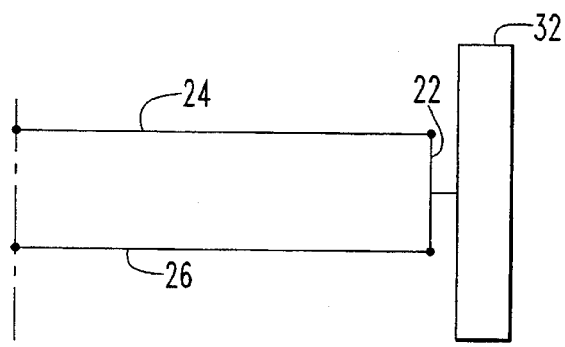
FIG. 2A is a schematic view of the wishbone suspension of FIG. 1 showing the suspension system when the wheel is not displaced.
Figure 2B:
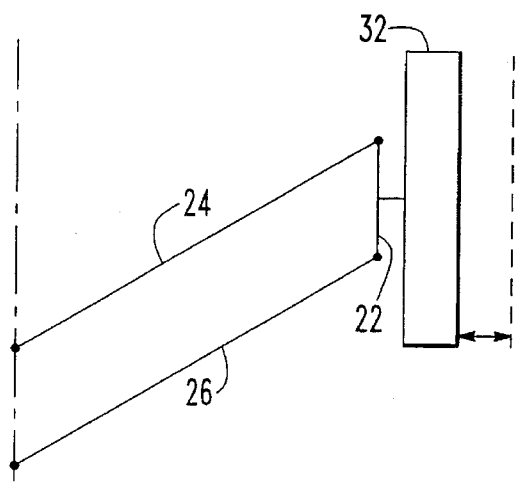
FIG. 2B is a schematic view of the wishbone suspension of FIG. 1 showing the suspension system when the wheel is vertically displaced.

By way of background, the conventional wishbone suspension system illustrated in FIGS. 1, 2A and 2B is designated generally by the reference numeral 20. As shown in FIGS. 1, 2A and 2B, the conventional wishbone suspension system 20 includes a wheel support 22, an upper wishbone 24 and lower wishbone 26. The upper and lower wishbones 24, 26 are connected at one end to the wheel support 22 and at their opposite ends to a vehicle chassis 28. The wheel support 22 rotatably supports a wheel 30 on which a tire 32 is mounted. As illustrated in FIGS. 2A and 2B, when the conventional wishbone suspension system is raised or lowered in response to variations in terrain, the tire 32 and accompanying wheel support 22 are moved vertically. In addition, the wheel 30 moves inward, i.e. toward the chassis 28.

FIGS. 3A–3D schematically illustrate the progression from a support bar directly connected to a chassis, to a support bar indirectly connected to a chassis, to two different lever arrangements that exploit the advantages of an indirect connection.

Figure 3A:
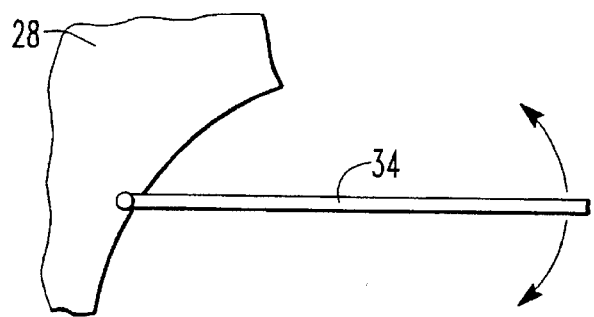
FIG. 3A is a schematic view of a single suspension bar pivotally connected to a vehicle chassis.

FIG. 3A is a schematic showing the movement of a single support bar 34 that is pivotally connected to the vehicle chassis 28. As the support bar 34 is raised and lowered, the support bar 34 forms an arc, as the unattached end of the support bar 34 moves closer to the chassis 28.

Figure 3B:
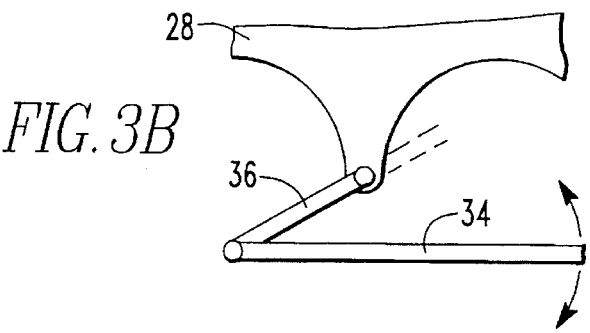
FIG. 3B is a schematic view of a suspension bar pivotally connected to an intermediate bar, which is pivotally connected to the vehicle chassis.

FIG. 3B shows a support bar 34 attached to an intermediate bar 36, which is attached to the vehicle chassis 28. While pivoting the support bar 34 may move the unattached end of support bar 34 closer to the chassis 28, the simultaneous movement of the intermediate bar 36 in a counterclockwise direction can be used to offset the reduced distance between the free end of the support bar 34 and the center line of the vehicle chassis 28 caused by rotation of support bar 34. Similarly, a lever slidably attached to a wheel support could offset lateral displacement in the wheel as the wheel is vertically deflected.

Figure 3C:
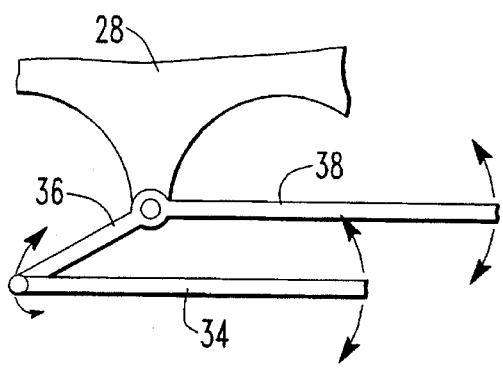
FIG. 3C is a schematic view of a suspension bar pivotally attached to a single piece lever, which is pivotally connected to the vehicle chassis.

FIG. 3C shows an embodiment utilizing a one piece lever 38 that includes the intermediate bar 36. The lever 38 is attached to the chassis 28 to move the suspension bar 34 that is attached to the end of the lever 34. As the lever is moved counterclockwise, and the lever 38 and support bar 34 rotate upward, the support bar 34 will be moved to the right a predetermined distance.

Figure 3D:
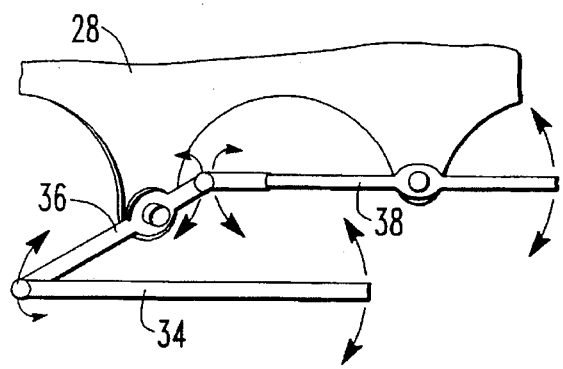
FIG. 3D is a schematic view of a suspension bar pivotally attached to a multiple segment lever, which has both segments pivotally attached to the vehicle chassis.

FIG. 3D schematically shows another lever 38 utilizing a two segment design. The two segments are pivotally connected to the chassis 28 as well as to one another. As with the single piece lever design, various multi-segment lever designs can provide the amount of compensation for lateral movement in the wheel support according to the demands of the application.

Figure 4A:
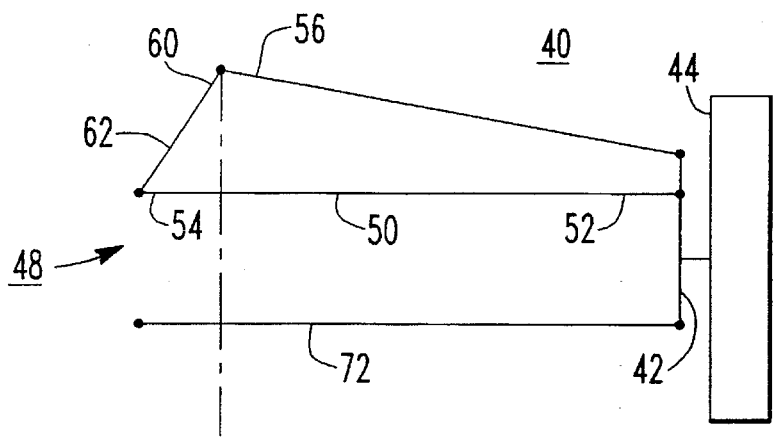
FIG. 4A is a schematic view showing an embodiment of the invention when the wheel has not been vertically displaced.
Figure 4B:
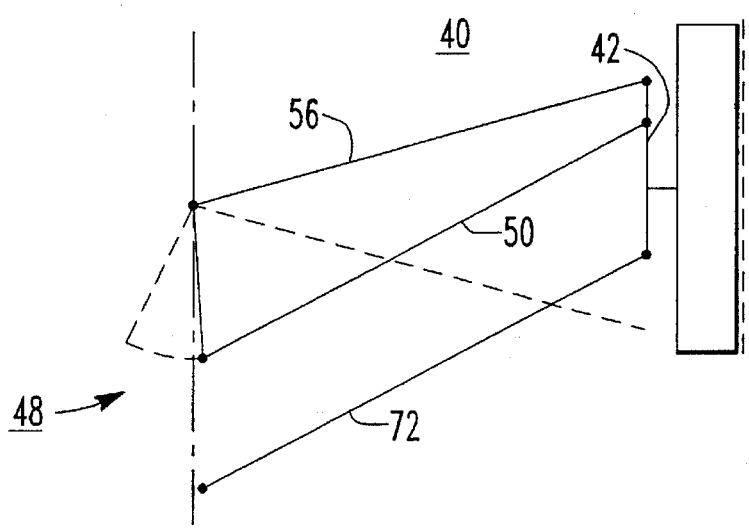
FIG. 4B is a schematic view of FIG. 4A when the wheel has been vertically displaced.

An exemplary embodiment of a wheel suspension system in accordance with the present invention is shown in FIGS. 4A and 4B and is designated generally by the reference numeral 40. In each of the embodiments illustrated, the wheel suspension system corresponds to a wheel on the right side of a vehicle. It is to be understood, however, that the invention may be utilized for one or both sets of wheels in the front or rear of the vehicle or the right side or left side of a vehicle only. This may vary according to the type of vehicle implementing the present invention. For example, in race car designs where the vehicle typically is driven in a single direction around a track, the inside or outside tires may be particularly prone to tire wear and abrasion due to the lateral displacement of the tires during the race. The invention can also be utilized in conjunction with both the steered wheels and non-streered wheels of a vehicle.

Figure 7:
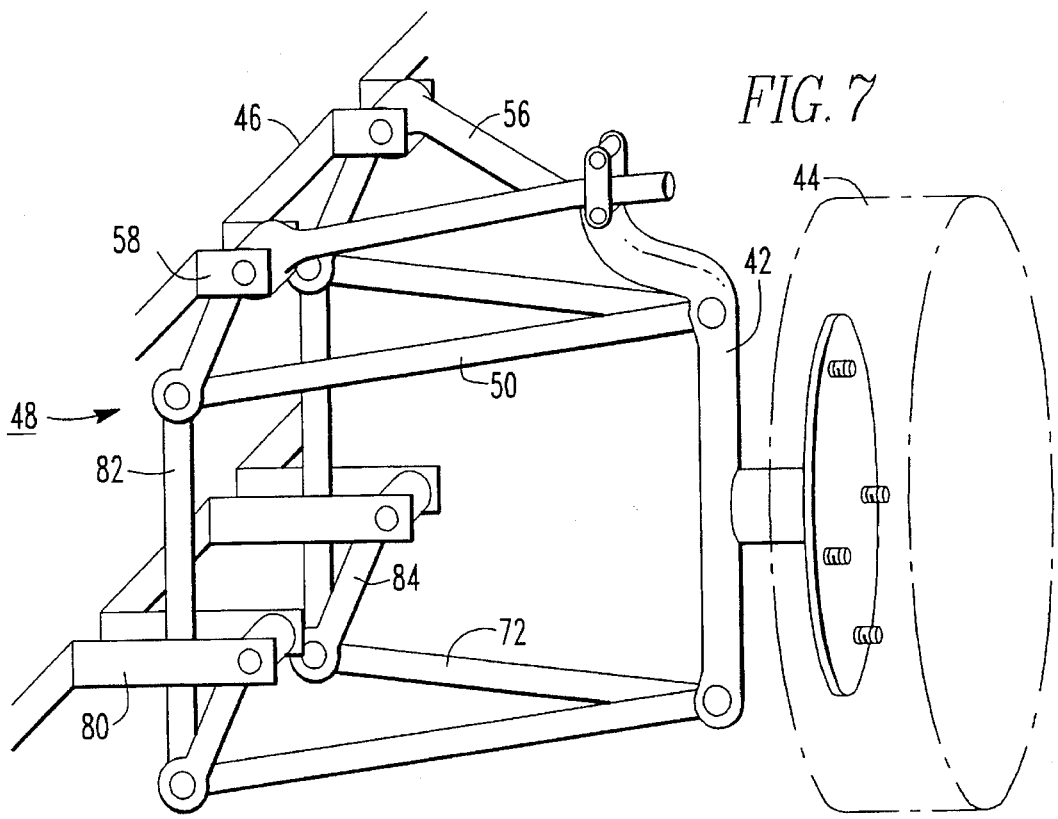
FIG. 7 is a perspective view of a wheel suspension system according to another embodiment of the invention.

As embodied herein and as shown in FIGS. 4A, 4B, and 7, the wheel suspension system 40 includes a wishbone assembly 48 that is connected to a wheel support 42, which rotatably supports a wheel 44 spaced laterally a predetermined distance from a vehicle chassis 46. The wishbone assembly 48 pivotally connects the wheel support 42 to the vehicle chassis 46. The wishbone assembly 48 includes a wishbone 50 having a first end 52 pivotally connected to the wheel support 42 and second ends 54 opposite the first end 52.

The wishbone assembly also includes a lever 56, which is connected to a bracket 58 mounted on the chassis 46. The lever 56 extends between the wheel support 42 and each of the second ends 54 of the wishbone 50. The lever 56 slidably engages the wheel support 42 and pivotally connects to the second ends 54 of the wishbone 50. The bracket 58 pivotally supports the lever 56 between the wheel support 42 and each of the second ends 54 of the wishbone 50. Accordingly, the wishbone assembly 48 controls the lateral displacement of the wheel 44 in response to movement of the wheel 44.

As embodied herein and shown generally in FIG. 4A, the lever is designed to control the extent to which the wheel 44 is displaced. In this regard, the lever 56 may include a bent portion 60 between the wheel support 42 and each of the second ends 54 of the wishbone 50. The extent to which the bent portion 60 pivots relative to the vertical movement of the wheel support 42 is a factor in controlling the degree of lateral displacement offset by the wishbone assembly 48. Preferably, the lever 56 includes an end 62 extending towards the second ends 54 of the wishbone 50. The end 62 of the lever 56 extends away from the wheel support 42 when an axle 64 of the wheel support 42 is substantially perpendicular to a longitudinal center line running the length of the vehicle chassis 46 at axle height. As shown in FIG. 7, the first end 52 of the wishbone 50 pivotally connects with the wheel support 42 at a location spaced transversely a greater distance from a longitudinal center line of the vehicle chassis 46 than a corresponding location along the wheel support 42 for slidably engaging the lever 56. This embodiment prevents lever 56, which extends through a slidable collar, from slipping off of the collar or from reaching and rubbing the tire as the wheel support 42 moves up and down.

Figure 5A:
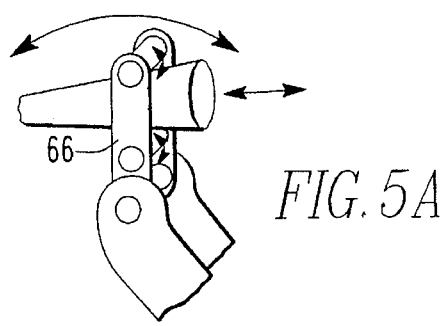
FIG. 5A is a partial perspective view of a lever in engagement with a wheel support according to one embodiment of the invention.
Figure 5B:
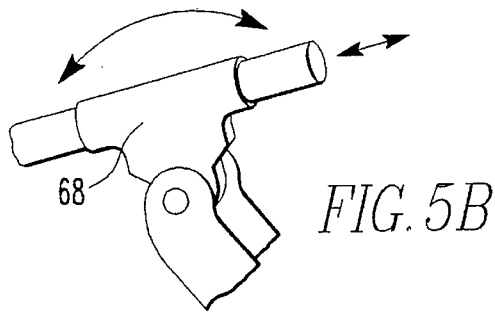
FIG. 5B is a partial perspective view of a lever in engagement with a wheel support according to another embodiment of the invention.
Figure 5C:
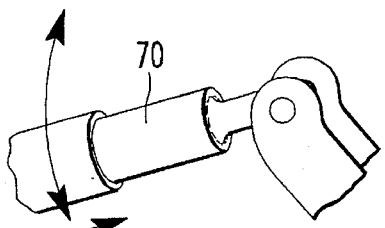
FIG. 5C is a partial perspective view of a lever in engagement with a wheel support according to still another embodiment of the invention.

FIGS. 5A, 5B, and 5C illustrate several alternatives for receiving the lever 56 in the wishbone assembly of the present invention. FIG. 5A shows a double hinge 66 pivotally connected to the wheel support 42. The double hinge 60 preferably includes rollers to facilitate reciprocating movement of the lever 56. FIG. 5B shows another preferred wishbone assembly 48 that includes a sliding collar 68 for receiving the lever 56. The sliding collar 68 also is pivotally connected to the wheel support 42. In the embodiment shown in FIG. 5C, a telescoping member 70 is provided on the wheel support for receiving the lever 56. The telescoping member 70 is pivotally connected to the wheel support 42.

Figure 6A:
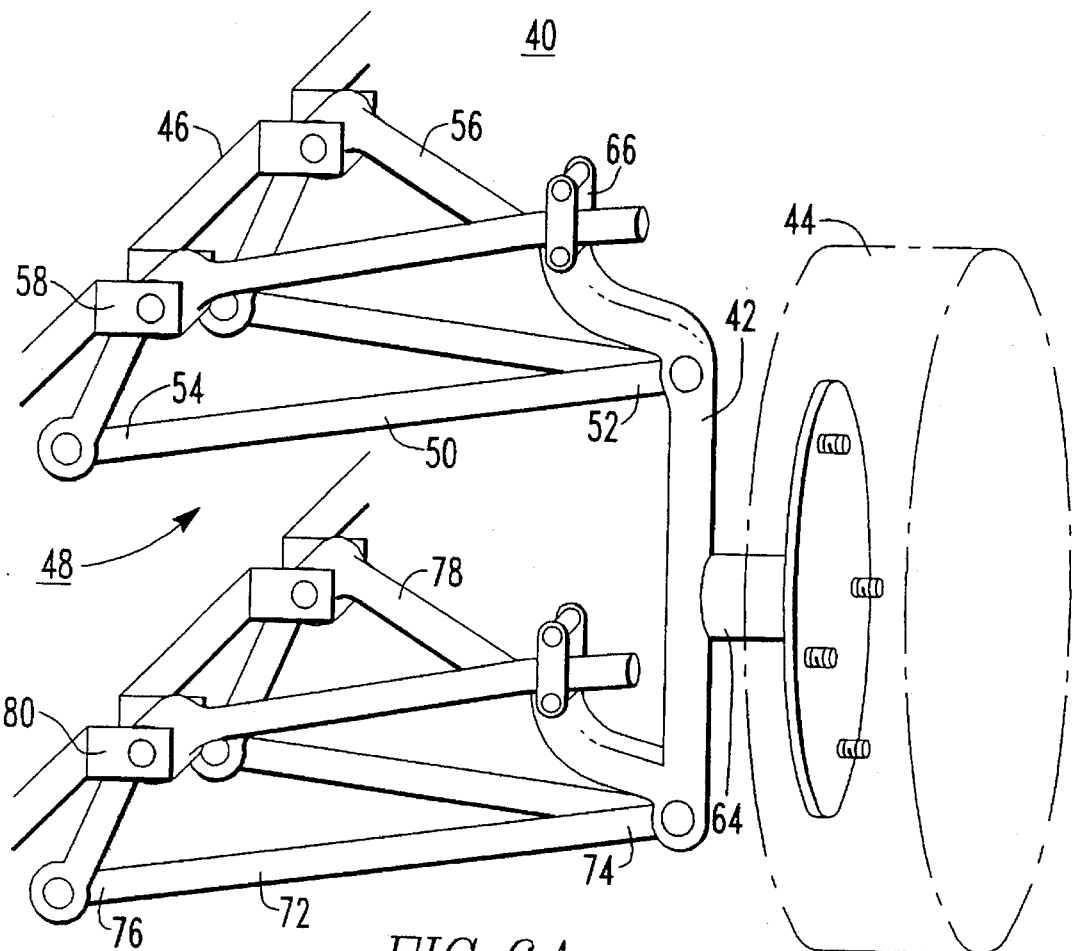
FIG. 6A is a perspective view of a wheel suspension system according to one embodiment of the invention.
Figure 6B:
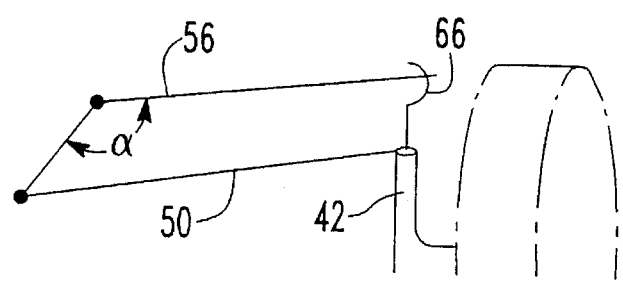
FIG. 6B is a schematic view illustrating the operation of the embodiment of FIG. 6A.
Figure 8A:
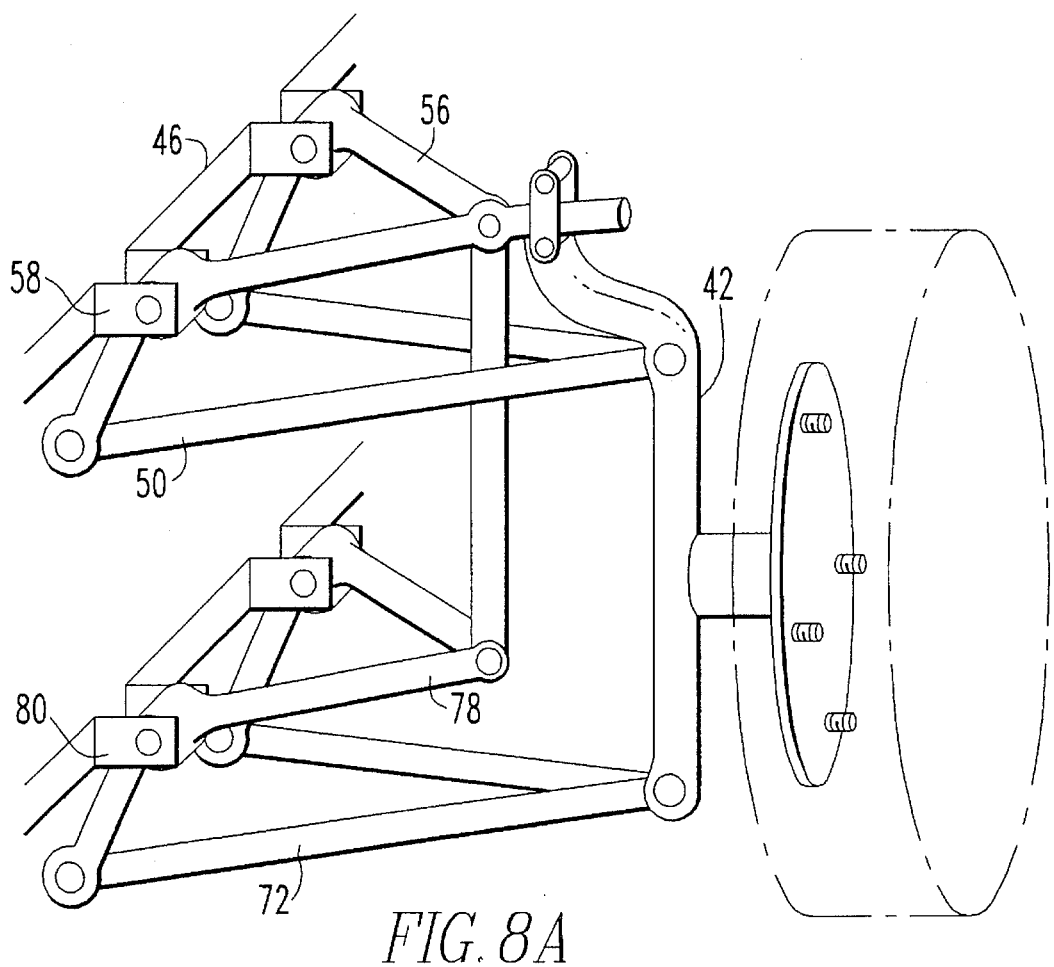
FIG. 8A is a perspective view of a wheel suspension system according to still another further embodiment of the invention.
Figure 8B:
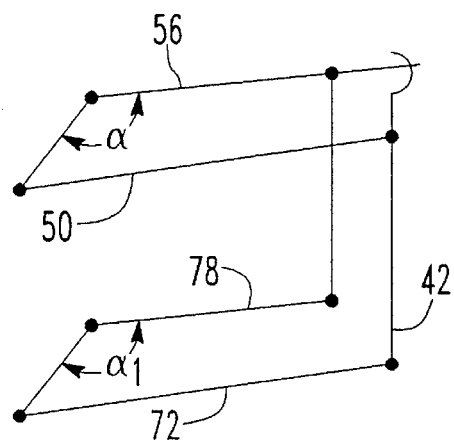
FIG. 8B is a schematic view illustrating the operation of the embodiment of FIG. 8A.
Figure 9A:
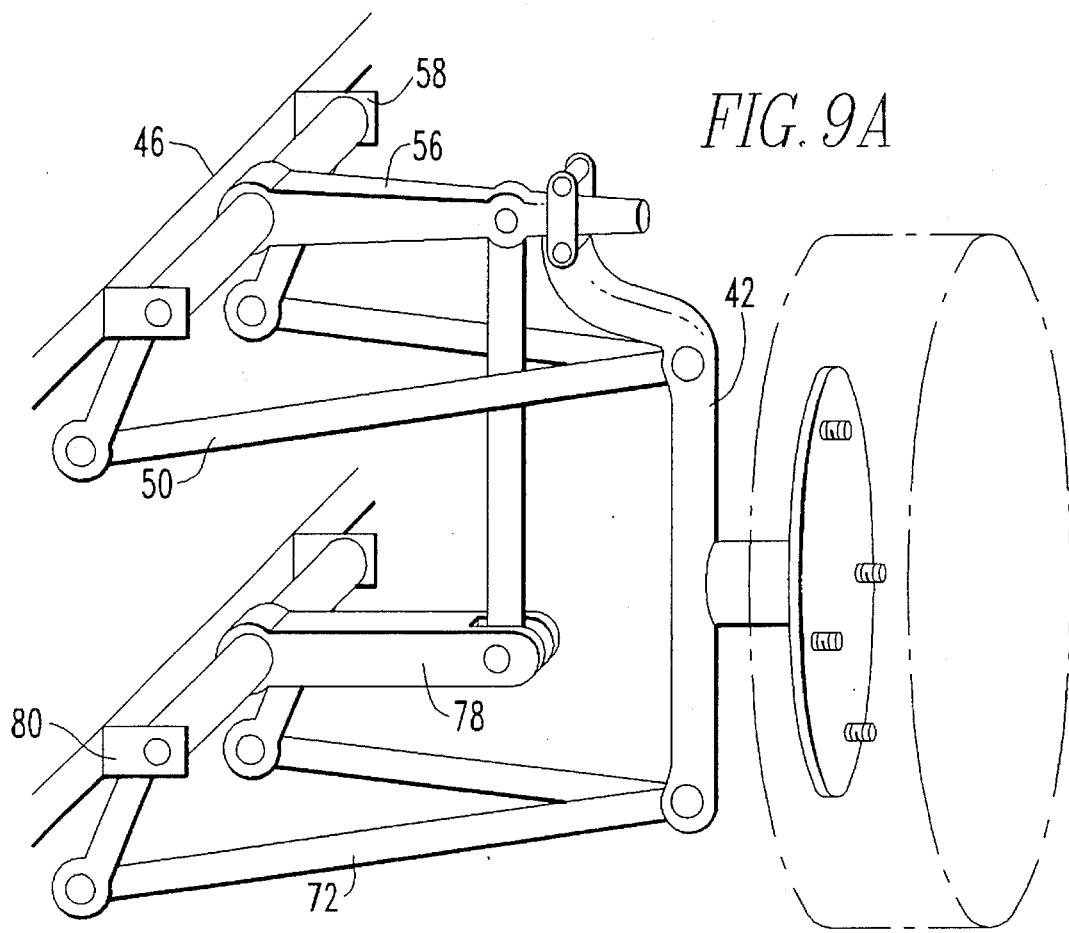
FIG. 9A is a perspective view of a wheel suspension system according to yet another embodiment of the invention.
Figure 9B:
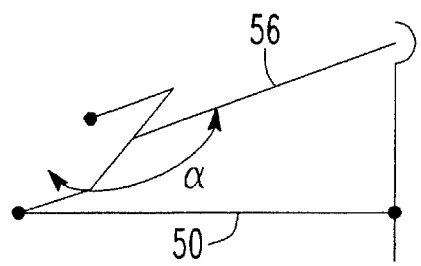
FIG. 9B is a partial schematic view illustrating the operation of the embodiment of FIG. 9A.

FIGS. 6A and 6B illustrate a double wishbone and double lever embodiment. As shown in FIGS. 6A and 6B, a preferred wishbone assembly 48 includes a secondary wishbone 72 having a first end 74 pivotally connected to the wheel support 42 and second ends 76 opposite the first end 74. The wishbone assembly 48 includes a secondary lever 78, which extends between the wheel support 42 and each of the second ends 76 of the secondary wishbone 72. The secondary lever 78 slidably engages the wheel support 42 and pivotally connects to the second ends 76 of the secondary wishbone 72. The wishbone assembly 48 includes a secondary bracket 80 mounted on the chassis 46 for pivotally supporting the secondary lever 78 between the wheel support 42 and each of the second ends 76 of the secondary wishbone 72.

In the embodiment shown in FIG. 7, the wishbone assembly 48 includes a secondary wishbone 72 pivotally connected to the wheel support 42 and operatively connected to the wishbone 50. The spacer bar 82 pivotally connects the second ends 76 of the secondary wishbone 72 and the second ends 54 of the wishbone 50. The wishbone assembly 48 includes a support bar 84 pivotally connected to the second ends 76 of the secondary wishbone 72. The wishbone assembly 48 includes a secondary bracket 80 mounted on the chassis 46 for pivotally supporting the support bar 84.

In the embodiment shown in FIGS. 8A, 8B, 9A, and 9B, the wishbone assembly 48 includes a secondary wishbone 72 having a first end 74 pivotally connected to the wheel support 42 and end portions 76 opposite the first end 74. The wishbone assembly 48 includes a secondary lever 78 extends between the lever 56 and each of the end portions 76. The secondary lever 78 pivotally connects to the lever 56 and the end portions 76 of the secondary wishbone 72. The wishbone assembly 48 includes a secondary bracket 80 mounted on the chassis 46 for pivotally supporting the secondary lever 78 between the lever 56 and the end portions 76 of the secondary wishbone 72.

Figure 10A:
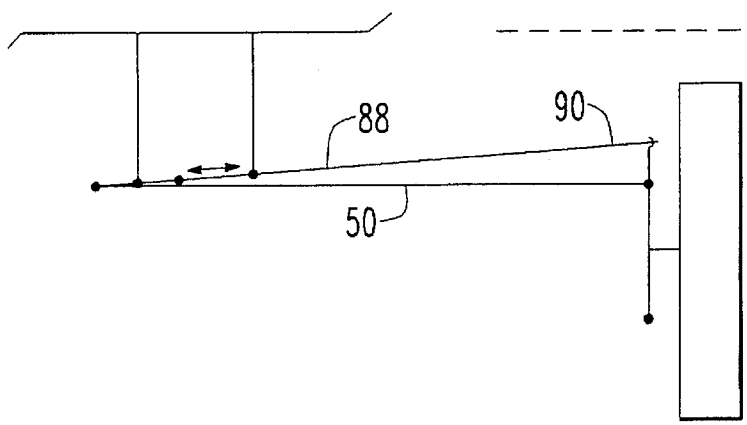
FIG. 10A is a schematic view showing another embodiment of the invention, when the wheel is in a normal position and has not been vertically displaced.
Figure 10B:
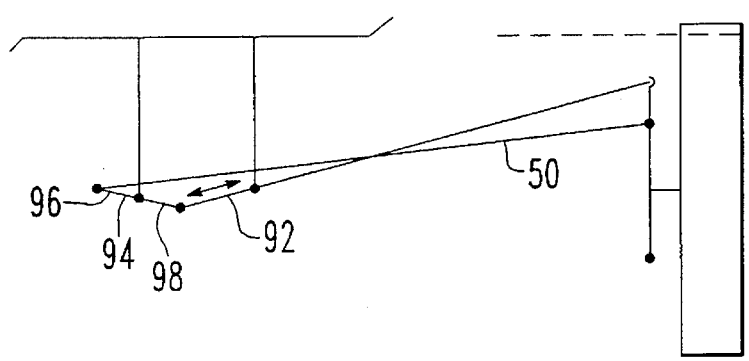
FIG. 10B is a schematic view, in part similar to FIG. 10A, and shows the embodiment when the wheel is raised above its normal position.
Figure 10C:
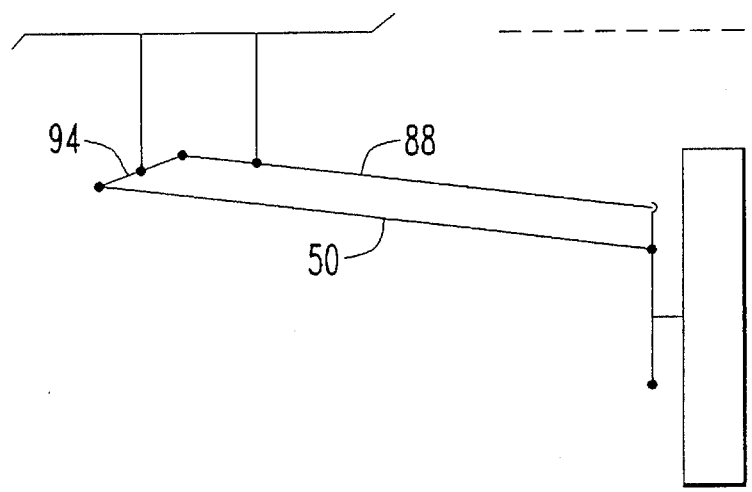
FIG. 10C is a schematic view, in part similar to FIG. 10A, and shows the embodiment when the wheel is lower than its normal position.
Figure 11:
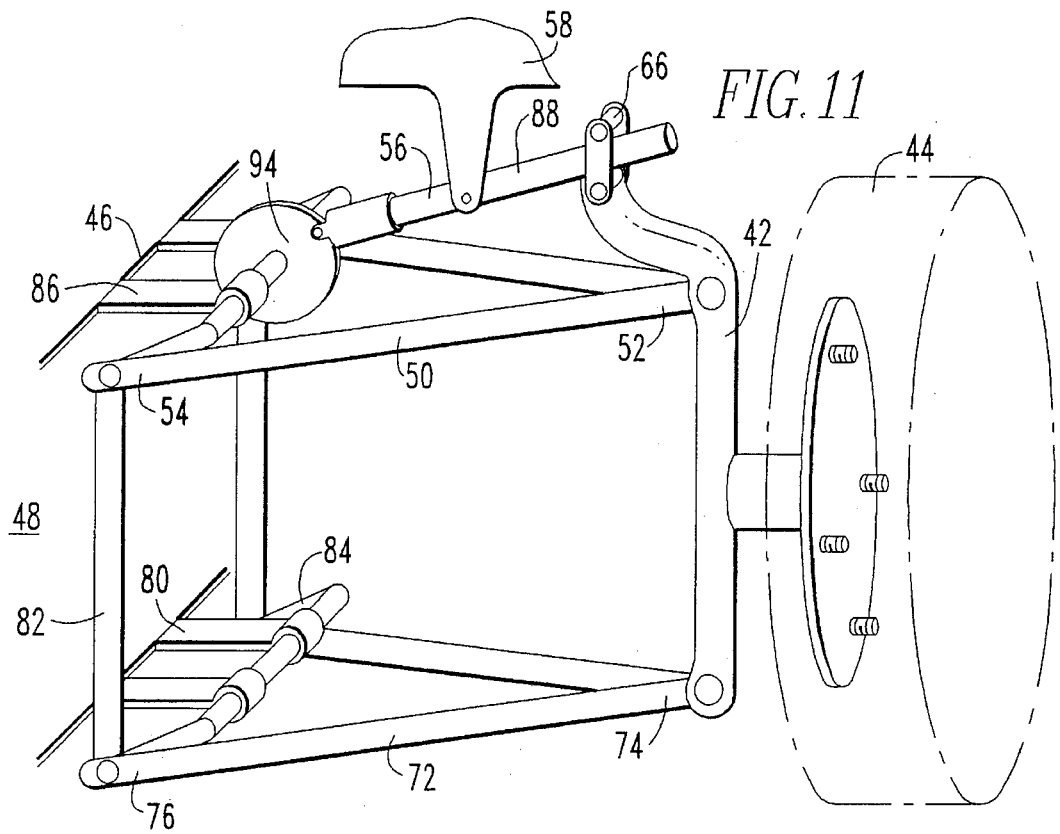
FIG. 11 is a perspective view of a wheel suspension system according to another embodiment of the invention.
Figure 12:
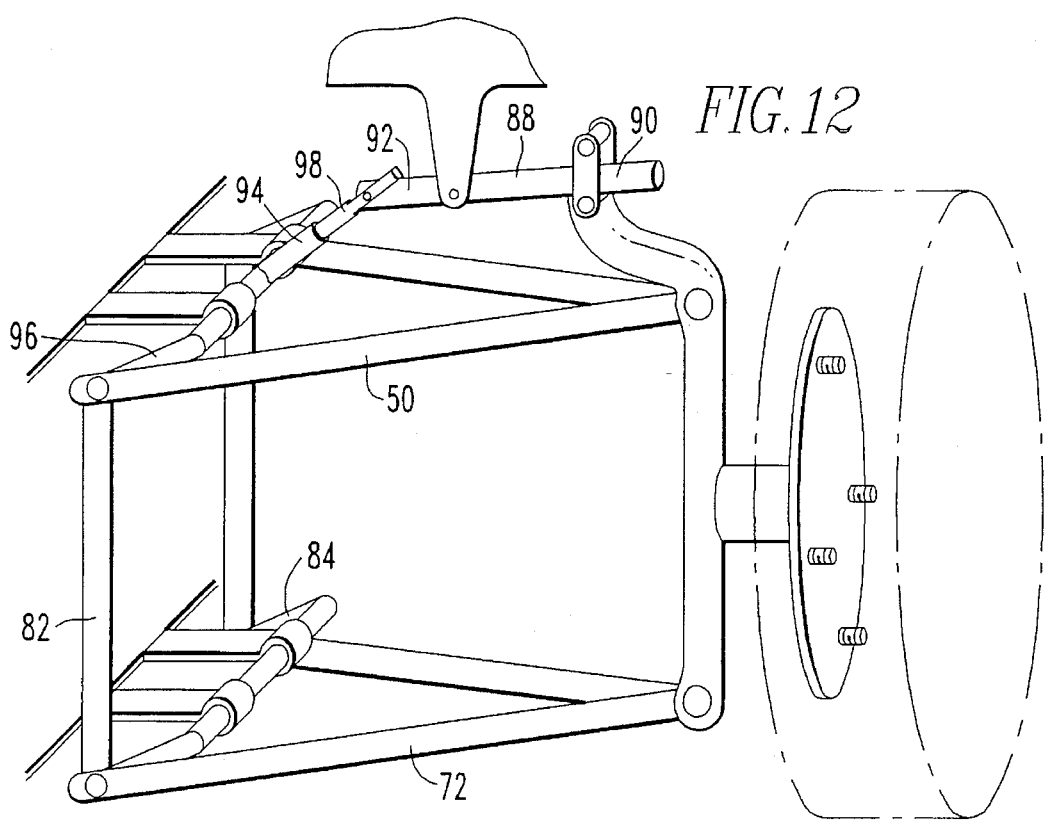
FIG. 12 is a perspective view of a wheel suspension system according to yet another embodiment of the invention.

FIGS. 10A, 10B, 10C, 11 and 12 show yet another embodiment of the present invention. FIGS. 10A, 10B, and 10C schematically illustrate a multiple segment lever having each of its segments supported and illustrate a wheel in an at rest condition, in a raised position, and in a lowered condition, respectively. The arrow represents that a portion of the lever preferably has an adjustable length feature, such as that encompassed by a telescoping member. FIGS. 11 and 12 illustrate two similar perspective views illustrating a preferred embodiment of a multiple segment lever arrangement.

In the embodiment shown in FIGS. 11 and 12, the wishbone assembly 48 includes a second bracket 86 depending from the chassis 46 and disposed above the wishbone assembly 48 for pivotally supporting the lever 56 between the wheel support 42 and each of the second ends 54 of the wishbone 50. The portion of the lever 56 between the bracket 58 and second bracket 86 is pivotally connected and adapted to have an adjustable length.

As shown in FIGS. 11 and 12, the lever 56 includes a first lever segment 88 having a first end 90 slidably engaging the wheel support 42 and a second end 92 opposite the first end 90. The lever 56 includes a second lever segment 94 having a first end 96 pivotally connected to the second ends 54 of the wishbone 50 and a second end 98 opposite the first end 96. The second ends 92, 98 of the first and second lever segments 88, 94 are pivotally connected to each other. The wishbone assembly 48 includes bracket 58 is mounted on the chassis 46 for pivotally supporting the first lever segment 88 between the wheel support 42 and the second end 92 of the first lever segment 88. The wishbone assembly 48 includes a second bracket 86 is mounted on the chassis 46 for pivotally supporting the second lever segment 94 between the second ends 54 of the wishbone 50 and the second end 98 of the second lever segment 94. The wishbone assembly 48 controls lateral displacement of the wheel in response to vertical movement of the wheel 44.

As shown in FIGS. 11 and 12, the wishbone assembly 48 may further include a secondary wishbone 72 having a first end 74 pivotally connected to the wheel support 42 and second ends 76 opposite the first ends 74 operatively connected to the wishbone 50. The wishbone assembly 48 includes a spacer bar 82 pivotally connected to the second ends 76 of the secondary wishbone 72 and the second ends 54 of the wishbone 50. The wishbone assembly 48 includes a support bar 84 pivotally connected to the second ends 76 of the secondary wishbone 72. A secondary bracket 80 mounted on the chassis 46 pivotally supports the support bar 84. Preferably, the first and second lever segments 88, 94 have an adjustable length and more preferably include a telescoping member.

In operation, the wishbone assembly of the present invention maintains the wheel 44 and wheel support 42 a predetermined lateral distance from a longitudinal center line running the length of the vehicle chassis 46 in response to movement of the wheel in a plane perpendicular to the predetermined distance. The actual amount of lateral displacement of the wheel in response to various degrees of vertical displacement both in a raised and lowered direction are dictated by the design requirements of a particular vehicle. For example, the requirements for a race car, go-cart, luxury vehicle, and semitrailer truck may vary dramatically according to the desires of the manufacturer and the advantages to be gained in cost, safety, and performance throughout the life of the particular vehicle.

While single and double segment levers have been explicitly shown in FIGS. 6A, 7, 8A, 9A, 11, and 12, as preferred embodiments of the present invention, it is contemplated as well that multiple lever segments of three or more could work in various applications according to the space requirements and needs of the particular vehicle. The term lever is intended to define a mechanical linkage that utilizes the principles disclosed in the present invention; namely, a linkage that slidably engages the wheel support 42 and either directly or through some number of intermediate linkage segments connects to a wishbone 50. Some or all of the various segments of the linkage mechanism are pivotally connected to the chassis 46 of the vehicle as required by the particular design to cause the desired control over the horizontal displacement of the wheel support 42.

The various devices for providing the sliding connection between the lever 56 and the wheel support 42 as well as between segments of a multiple segment lever are exemplary and exemplary only. In addition to the double hinge with rollers, collar, and telescoping member, shown in FIGS. 5A, 5B, and 5C, various other arrangements known to those skilled in the art could be utilized to allow the lever 56 to slidably engage the wheel support 42 and for segments of a multiple segment lever to move and adjust lengthwise between fixed bracket points.

There are differences between a single piece lever and multiple segment lever. In the single piece lever, the range of motion for swinging the lever has a compensation effect in a single direction starting from the position of the wishbone where it points directly away from the vehicle chassis. In the preferred single piece lever embodiment, the direction is upward. Within this range of motion, the wishbone will reduce the lateral displacement of the wheel caused by the swing of the lever. At swinging motions below the position where the wishbone is pointing directly away from the vehicle chassis, the angle of the wishbone tends to reduce the absolute distance between the wheel support and the vehicle chassis. Moreover, the single piece lever embodiment now magnifies the lateral displacement effect instead of compensating for it. For certain designs, this situation may be efficient and acceptable. In the double hinged or double segmented lever arrangement, the compensation occurs both when the wishbone angles itself in a positive and negative swing relative to a direction away from the vehicle chassis.

In all embodiments of the present invention that use a wishbone assembly it is understood that the wishbone may be a single triangular element as opposed to a V-shaped element having two arms. Additionally, it should be understood that a single bar or arm can be substituted for and is meant to be included with the wishbone element. As used in the present invention, the term wishbone is meant to include reasonable derivations therefrom including a bar or pipe that can be pivotally connected on its ends. With the above being stated, all definitions including a wishbone assembly may include an arm assembly and all mentions throughout the specification of a wishbone include an arm.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed herein, but that the invention include all embodiments falling within the scope of the appended claims.

I claim:

1. A wheel suspension system comprising:
   a wheel support for rotatably supporting a wheel spaced laterally a predetermined distance from a vehicle chassis;
   a wishbone assembly for pivotally connecting said wheel support to said vehicle chassis, said wishbone assembly including:
      a wishbone having a first end pivotally connected to said wheel support and second ends opposite said first end;
      a lever extending between said wheel support and each of said second ends, said lever slidably engaged with said wheel support and pivotally connected to said second ends; and
      a bracket mounted on said chassis for pivotally supporting said lever between said wheel support and each of said second ends;
   whereby said wishbone assembly controls lateral displacement of said wheel in response to movement of said wheel.

2. The wheel suspension system of claim 1, wherein said lever has a bent portion between said wheel support and each of said second ends.

3. The wheel suspension system of claim 1, wherein said lever includes an end extending towards said second ends, said end of said lever extends away from said wheel support when an axle of said wheel support is substantially perpendicular to a longitudinal center line running the length of the vehicle chassis at axle height.

4. The wheel suspension system of claim 1, wherein said first end of said wishbone pivotally connects said wheel support at a location spaced transversely a greater distance from a longitudinal center line of said vehicle chassis than a corresponding location along said wheel support for slidably engaging said lever.

5. The wheel suspension system of claim 1, wherein said wishbone assembly also includes a double hinge for receiving said lever, said double hinge being pivotally connected to said wheel support.

6. The wheel suspension system of claim 1, wherein said wishbone assembly also includes a sliding collar for receiving said lever, said sliding collar being pivotally connected to said wheel support.

7. The wheel suspension system of claim 1, wherein said wishbone assembly also includes a telescoping member for receiving said lever, said telescoping member being pivotally connected to said wheel support.

8. The wheel suspension system of claim 1, wherein said wishbone assembly also includes:
- a secondary wishbone having a first end pivotally connected to said wheel support and second ends opposite said first end;
- a secondary lever extending between said wheel support and each of said second ends of said secondary wishbone, said secondary lever being slidably engaged with said wheel support and pivotally connected to said second ends of said secondary wishbone; and
- a secondary bracket mounted on said chassis for pivotally supporting said secondary lever between said wheel support and each of said second ends of said secondary wishbone.

9. The wheel suspension system of claim 1, wherein said wishbone assembly also includes a secondary wishbone pivotally connected to said wheel support and operatively connected to said wishbone.

10. The wheel suspension system of claim 9, wherein said wishbone assembly also includes a spacer bar pivotally connected to said second ends of said secondary wishbone and said second ends of said wishbone.

11. The wheel suspension system of claim 10, wherein said wishbone assembly also includes:
- a support bar pivotally connected to said second ends of said secondary wishbone; and
- a secondary bracket mounted on said chassis for pivotally supporting said support bar.

12. The wheel suspension system of claim 1, wherein said wishbone assembly includes:
- a secondary wishbone having a first end pivotally connected to said wheel support and end portions opposite said first end;
- a secondary lever extending between said lever and each of said end portions, said secondary lever being pivotally connected to said lever and said end portions; and
- a secondary bracket mounted on said chassis for pivotally supporting said secondary lever between said lever and said end portions of said secondary wishbone.

13. The wheel suspension system of claim 1, wherein said wishbone assembly includes a secondary bracket depending from said chassis and disposed above said wishbone assembly for pivotally supporting said lever between said wheel support and each of said second ends, said lever between said bracket and second bracket being pivotally connected and adapted to have an adjustable length.

14. A wheel suspension system comprising:
- a wheel support for rotatably supporting a wheel spaced laterally a predetermined distance from a vehicle chassis;
- a wishbone assembly for pivotally connecting said wheel support to said vehicle chassis, said wishbone assembly including:
  - a wishbone having a first end pivotally connected to said wheel support and second ends opposite said first end;
  - a lever extending between said wheel support and each of said second ends, said lever having a first lever segment having a first end slidably engaging said wheel support and a second end opposite said first end, said lever having a second lever segment having a first end pivotally connected to said second ends of said wishbone and a second end opposite said first end, said second ends of said first and second lever segments being pivotally connected to each other;
  - a bracket mounted on said chassis for pivotally supporting said first lever segment between said wheel support and said second end of said first lever segment; and
  - a secondary bracket mounted on said chassis for pivotally supporting said second lever segment between said second ends of said wishbone and said second end of said second lever segment;
- whereby said wishbone assembly controls lateral displacement of said wheel in response to movement of said wheel.

15. The wheel suspension system of claim 14, further comprising a secondary wishbone having a first end pivotally connected to said wheel support and second ends opposite said first end operatively connected to said wishbone.

16. The wheel suspension system of claim 15, wherein said wishbone assembly also includes a spacer bar pivotally connected to said second ends of said secondary wishbone and said second ends of said wishbone.

17. The wheel suspension system of claim 16, wherein said wishbone assembly also includes:
- a support bar pivotally connected to said second ends of said secondary wishbone; and
- a secondary bracket mounted on said chassis for pivotally supporting said support bar.

18. The wheel suspension system of claim 14, wherein at least one of said second ends of said first and second lever segments has an adjustable length.

19. The wheel suspension system of claim 18, wherein said segments having an adjustable length include a telescoping member.

20. The wheel suspension system of claim 14, wherein said wishbone assembly also includes one of a double hinge, a sliding collar, or a telescoping member for receiving said lever, one of said double hinge, said sliding collar, or said telescoping member being pivotally connected to said wheel support.

21. The wheel suspension system of claim 14, wherein said wishbone assembly maintains said wheel a substantially constant predetermined lateral distance from a longitudinal center line running the length of the vehicle in response to movement of said wheel in a plane perpendicular to said predetermined distance.

22. A wheel suspension system comprising:
- a wheel support for rotatably supporting a wheel spaced laterally a predetermined distance from a vehicle chassis;
- an arm assembly for pivotally connecting said wheel support to said vehicle chassis, said arm assembly including:

an arm having a first end pivotally connected to said wheel support and a second end opposite said first end;

a lever extending between said wheel support and each of said second ends, said lever slidably engaged with said wheel support and pivotally connected to said second end; and a bracket mounted on said chassis for pivotally supporting said lever between said wheel support and each of said second ends;

whereby said arm assembly controls lateral displacement of said wheel in response to movement of said wheel.

* * * * *